United States Patent [19]
Elvander et al.

[11] 3,948,645
[45] Apr. 6, 1976

[54] METHOD OF CARRYING OUT HEAT-REQUIRING CHEMICAL AND/OR PHYSICAL PROCESSES IN A FLUIDIZED BED

[75] Inventors: Hans Ivar Elvander; Ingvar Anton Olof Edenwall, both of Helsingborg; Karl Göran Görling, Lidingo; Douglas Sewerin Ekman, Helsingborg, all of Sweden

[73] Assignee: Boliden Aktiebolag, Stockholm, Sweden

[22] Filed: Apr. 22, 1974

[21] Appl. No.: 462,959

[30] Foreign Application Priority Data
  Apr. 30, 1973 Sweden.............................. 7306065
  Oct. 23, 1973 Sweden.............................. 7314373
  Mar. 1, 1974 Sweden.............................. 7402747

[52] U.S. Cl. ................................ 75/26; 75/3; 75/9
[51] Int. Cl.$^2$............................................ C22B 1/10
[58] Field of Search................................ 75/3–5, 26, 75/32, 9; 23/284

[56] References Cited
UNITED STATES PATENTS
3,440,731  4/1969  Tuthill ................................. 75/26
3,582,288  6/1971  Taylor................................... 23/284

FOREIGN PATENTS OR APPLICATIONS
215,713  10/1967  Sweden................................. 75/26
407,060  8/1966  Switzerland............................ 75/26

*Primary Examiner*—Peter D. Rosenberg
*Attorney, Agent, or Firm*—Stevens, Davis, Miller & Mosher

[57] ABSTRACT

A bed comprising fluidized particulate material and having a resistivity ($\rho$) between $10^{-1}$ and 10 ohm $m$ is heated in a reaction chamber by means of an induction coil surrounding said chamber. The heat is generated in the bed itself by passing an alternating current through said coil. There is maintained between the least cross dimension ($d$) of the bed area and the penetration depth ($\delta$) of the inductive field a ratio determined by the relationship

$$d/\delta = k\,(0.54 - 0.35 \cdot {}^{10}\!\log \rho)$$

where $k$ is a numerical value between 0.2 and 1.5.

58 Claims, 12 Drawing Figures

METHOD OF CARRYING OUT HEAT-REQUIRING CHEMICAL AND/OR PHYSICAL PROCESSES IN A FLUIDIZED BED

The present invention relates to a method of carrying out heat-requiring chemical and/or physical processes in a reactor chamber having a fluidized bed arranged therein, wherewith at least part of the energy required for said process is generated electroinductively in the bed itself by using at least one induction coil, through which alternating current is arranged to pass and which is located externally of the reactor chamber.

The fluidized bed is used within the art for a large number of purposes, for which the special properties possessed by the bed and the advantages afforded thereby are useful, namely a high mass and heat transfer rate, the possibility of maintaining a uniform temperature in the bed and of readily controlling the same, and its particular suitability for continuous processes.

When carrying out endothermic reactions in a fluidized bed, however, the supply of heat to the bed often creates a problem. If it were possible to heat a fluidized bed electrically, its utility within the chemical and metallurgical field would greatly increase.

Consequently, attempts have been made to electrically heat the bed in a number of different ways. For example, the bed may be resistance heated by passing an electric current through the bed, via electrodes immersed therein, or the heat may be supplied from electric resistance elements immersed in the bed.

Electroinductive heating techniques have also been applied to the aforementioned end. When using low frequency current, heat is supplied to the bed via an inductively heated metal ring immersed in the bed, or the actual reactor shell is heated in the same way. The generation of heat in the bed itself by induction has also been applied, although hitherto this method could only be effected while using very high frequences, namely frequences of such magnitude that the penetration depth of the electromagnetic field in each particle of the bed is of the same order of magnitude as the cross dimension of said particle.

It has now surprisingly been found that a particularly favourable result can be achieved from a technical and economic aspect when carrying out processes of the type mentioned in the introduction if, in accordance with the present invention, there is used a fluidized bed containing material which provides the bed with a resistivity of between $10^{-1}$ and 10 ohm $m$, wherewith the frequency of the alternating current is so selected in dependence of the selected smallest cross dimension ($d$) of bed area and of the resistivity ($\rho$) of the bed that there is maintained a relationship between said smallest dimension ($d$) and the electromagnetic field penetration depth ($\delta$), which is determined by frequency and resistivity, of between 0.2 and 1.5, preferably a value determined by the relationship $$d/\delta = k (0.54 - 0.35 \cdot {}^{10}\!\log\rho)$$

where $k$ is a number between 1.1 and 1.5, preferably approximately 1.2. The term penetration depth is used in its accepted meaning, namely designating $$\delta = \sqrt{(2 \cdot \rho/\omega \cdot \mu}$$

where $\omega$ is the angular frequency of the electromagnetic field measured in radians per second, $\mu$ is the permeability (for non-magnetic material approximately $4\pi \cdot 10^{-7}$) and $\rho$ is the resistivity of the fluidized bed measured in ohm $m$. The cross dimension $d$ of the bed area is measured in meters. The resistivity of the bed can be adjusted within certain limits by selecting, inter alia, the degree of bed fluidization, the fluidizing medium, the particle size of the bed material and the temperature of the bed.

In accordance with the invention, it has been found possible to carry out processes of the type envisaged in fluidized beds which are directly heated inductively and which have dimensions suitable for operations on an industrial scale, without using extremely high frequencies. By way of example, it can be mentioned that when inductively heating a circular fluidized bed having a diameter of 7.5 m and comprising particles of coke with an average particle size of 0.15 mm, and having a resistivity of 6.5 ohm $m$, a frequency as low as 2600 Hz was found sufficient with a ratio between the height and diameter of the induction coil of 0.6:1.

In accordance with the invention, it has been found that very high quantities of energy can be generated in a fluidized bed with an electromagnetic field of moderate strength. At the same time, losses caused by inductively heating the induction coil, when the coil is made of copper, has been found to reach only some few percent of the energy supplied. Thus, with the aforementioned example, approximately 30 MW were generated in the coke bed at a field strength of only 50 kA/m; the losses in the copper coil reached only 600 kW, i.e. 2% of the energy supplied.

This good result was achieved at a ratio between reactor diameter and penetration depth of only 0.29:1, as compared with the standard ratio of 2.5:1 when heating material of low resistivity in accordance with known techniques. The electrical efficiency obtained with the present invention, which efficiency is extremely high in comparison with known inductive heating techniques, should also be noted.

Compared with conventional methods of supplying heat to a fluidized bed, the method of the present invention also affords other advantages, such as:

- large quantities of energy can be generated in the bed without the risk of local overheating caused by the use of combustion techniques in the bed or the heating of the bed via the reactor wall, heating elements or electrodes,
- material problems created by the aforementioned heat supply methods are eliminated,
- a current of moderately high frequency can be used, which in distinction to previously used ultra-high frequencies can be obtained at low costs,
- the elimination of complicated electrode equipment and the operation costs connected therewith,
- simple power regulation with the possibility of automatically controlling reactor temperature in a simple manner,
- simple reactor construction,
- improved possibility of sealing the reactor,
- a higher degree of flexibility with respect to reactor design.

Both reducing and oxidizing processes can be carried out simultaneously in a reactor constructed in accordance with the invention. For example, part of the heat required to carry out the process can be supplied by burning combustible substances in the reactor, either by controlled combustion in the bed itself or total or partial combustion above the surface of the bed; the burnible substances may comprise gases departing from the fluidized bed and/or additive fuel supplied above the bed. In this latter instance the absence of electrodes together with a reactor of relatively large cross section affords great advantages, since it is possible to operate at high temperatures and to transfer large quantities of heat to the surface of the fluidized bed. Thus, in accordance with the method of the invention, it is not necessary to supply all of the heat required electro-inductively.

When burning combustible substances in the reactor, heat which is not taken up by the material in the reactor chamber can be recovered in a radiation portion of a steam boiler arranged adjacent the reactor, said radiation portion being located in the reactor chamber above the bed, wherewith at least part of the heat content of the gases formed in the reactor chamber can be used for producing steam or electrical energy. Irrespective of whether combustion takes place in the reactor or not, the heat content of the gases departing from the reactor can be used for producing electrical energy, e.g. through steam or gas turbine, suitably hot air turbine.

The electric energy produced can be used to supply energy to the process, and the electric energy can be produced in the form of alternating current at the frequency used for the process in question. Similarly, still hot air departing from the hot air turbine can be used for the aforementioned combustion process in the reactor chamber, thereby obtaining a high degree of thermal efficiency in the process.

The invention can be used to advantage in conjunction with the cracking of hydrocarbons, e.g. mineral oil products, during the simultaneous manufacture of petroleum coke, the hydrocarbons being supplied preferably substantially continuously to a fluidized coke bed, wherewith there is maintained inductively in the bed a temperature sufficient to crack the hydrocarbons and to form coke therefrom and from resulting cracking products, said bed being continuously built up by said coke formation, wherewith substantially corresponding quantities of coke are removed from the reactor chamber to maintain a substantially unchanged bed volume. In this respect, the hydrocarbons are suitably injected into the inductively heated fluidized petroleum coke bed.

The bed is maintained in a fluidized state by means of gas, which to advantage may comprise part of the gas departing from the reactor, said gas being recirculated, suitably in a pre-heated state. The gas developed during the cracking and coking process may also be made to contribute to fluidizing the bed. In certain cases, this latter gas may alone be sufficient to fluidize the bed.

The volume of the fluidized bed can be maintained constant, either by tapping excessive bed material from the bottom of the reactor or by the arrangement of a weir device. By increasing the velocity of the gas through the reactor, coke can be caused to accompany the departing gas, from which the coke is separated in cyclones. The speed at which the gas is passed through the reactor can be so high that the quantity of coke entrained with the gas is greater than that produced. The surplus coke can be returned from the cyclones to the bed.

The advantage afforded by the described method over the conventional manufacture of petroleum coke resides in the structural simplicity of the reactor and the high volumetric capacity such a reactor obtains. A further advantage resides in the fact that the method permits a free choice of coking temperature. By employing a suitable combination of high temperature and residence time, it is possible, e.g., to obtain desulphurization of the petroleum coke produced.

The method can also be applied for removing undesirable substances from petroleum coke produced by other methods, e.g. for refining such coke with respect to sulphur. In this instance, petroleum coke is charged preferably substantially continuously to a fluidized bed comprising substantially of a refined coke material, wherewith the heat generated inductively in the bed and the bed temperature and residence time of the material in the bed are adjusted so that the desired refining effect is obtained, whereafter refined coke material is discharged substantially continuously from the reactor to maintain a substantially unchanged bed volume. The fluidizing gas, which is suitably preheated, may comprise a gas inert to the coke, or a hydrogen-containing gas, e.g. hydrogen gas.

The invention can also be used to advantage in conjunction with the cracking of heavy hydrocarbons. In this respect there is used a permanent, inductively heated fluidized bed, comprising metal particles having a catalytic effect on the cracking reaction. The heavy hydrocarbons may be charged to the bed substantially continuously, e.g. may be injected into said bed, which is held in a fluidized state by means of at least the gases formed in the actual bed during the cracking process. The bed may also be held in a fluidized state by means of hydrogen gas supplied thereto, which is caused to react with the heavy hydrocarbons to form new hydrocarbons richer in hydrogen. These hydrocarbons depart from the bed in gas form and are recovered in a conventional manner externally of the reactor. Water steam may also be used as a cracking and fluidizing medium.

The advantage afforded by this cracking method is that it is possible to convert large quantities of material in a reactor of relatively small volume, owing to the high reaction speeds obtainable in the fluidized bed, at the same time as the inductive heating affords a constructively simple solution to the problem of supplying heat to a cracking reactor.

Another field in which the method of the invention can be used to advantage is the pyrolysis of solid organic material, e.g. lignite, or the calcination of such material, e.g. anthracite.

The material to be pyrolysed or calcinated is charged preferably continuously to a bed which substantially comprises coke or calcined products formed during the process. The bed is heated inductively to at least a temperature of such magnitude that the material charged to the bed is decomposed to form coke or a calcined product and liberated hydrocarbons, which are caused to react with the solid residue during the precipitation of carbon, to form material which replenishes the bed, and lighter hydrocarbons, and/or hydrogen gas. The gases required to fluidize the bed may comprise gas departing from the reactor and recirculated to the bed, suitably in a pre-heated state. The gas developed during pyrolysis may also be made to contribute to fluidizing the bed. In certain cases, this latter gas may alone be sufficient to fluidize the bed. The bed is maintained at substantially constant volume by removing material therefrom, e.g. in the manner described with reference to the manufacture of petroleum coke. The resulting carbon or coke products may be used e.g. for manufacturing briquettes.

With the method according to the invention, coke or carbon can be produced from solid fuel having poor coking properties, e.g. lignite, or from different types of waste, e.g. saw dust. One important advantage afforded hereby is that neither tar nor other normally occurring troublesome distillation products are formed.

When utilizing the method of the invention for calcining anthracite, there is obtained a product which possesses extremely uniform and readily controlled properties, owing to the uniform heating of the bed throughout the whole bed.

The method of the invention can also be applied in conjunction with the reduction of a gaseous medium and/or so called carburation thereof, wherewith the gas is caused to pass through and simultaneously to fluidize an inductively heated bed, wherein the medium is brought into contact with a reductant, optionally in the presence of a material having a catalytic effect on the reduction and/or carburation process, the bed being maintained at such a temperature that the reductant reacts with said medium during the reduction and/or carburation thereof. As an example of the application of this method can be mentioned the regeneration of gas derived from a sponge iron furnace. This gas contains, i.a., $CO$, $H_2$, $CO_2$ and $H_2O$. The last two gas types are converted to $CO$ and $H_2$ in accordance with the aforegoing, whereafter the gas is recirculated to the sponge iron furnace. The advantage afforded by this method over hitherto used electric, electrode-provided carburators, include the low operation costs involved, the possibility of using secondary, solid fuels and the substantial elimination of the hitherto necessary limitation on the size of the reactor.

In accordance with one embodiment of the invention, there is used a bed of coke material, which, at the same time, forms said reductant and is progressively consumed. The consumed coke can be replaced by supplying solid, liquid or gaseous organic material to the bed, wherewith the bed is maintained at least at such a temperature that coke is formed by pyrolysis of said material and by cracking the pyrolysis gas. Ash is formed as the coke is consumed. The temperature of the bed is suitably held so high that the ash is caused to agglomerate into relatively coarse grain products, which owing to their heavier weight relative to the coke are collected at the bottom of the reactor, from where they can be removed, either intermittently or continuously.

In accordance with another embodiment of the invention, the bed may be comprised substantially of a metallic material, suitably a material having a catalytic effect on the reduction and/or carburation reactions. With a further embodiment, the bed material may comprise particles coated with carbon. The carbon layer makes the particles electrically conductive and also acts as a reductant. The carbon layer is progressively consumed, but can be replaced by supplying hydrocarbons, which are cracked, resulting in carbon being precipitated during the cracking process. Examples of cases with which the two last mentioned methods can be applied to advantage include the reformation of natural gas, wherewith said gas is caused to react with water steam.

The method of the present invention can also be used to advantage in conjunction with the reduction of oxidic material, especially oxides of metals from the iron group or oxidic copper material. The metal oxides are supplied in a fluidizable particle size to an inductively heated fluidized bed comprising mainly coke. The coke is progressively consumed and can be replaced by supplying organic, solid, liquid or gaseous material to the bed, wherewith the bed is maintained at such a temperature that coke is formed from the organic material by pyrolysis and cracking, while carbon precipitates out.

In accordance with one embodiment of this method, the temperature is controlled so that reduced metal is caused to agglomerate into granules, which owing to the fact that they have a greater weight in relation to the coke bed collect at the bottom of the reactor chamber, from where they can be removed, either intermittently or continuously, optionally together with coke ash agglomerated in a corresponding manner. This embodiment is of particular interest when concerned with metals from the iron group.

In accordance with a second embodiment of said method, the temperature in the fluidized bed is controlled so that reduced metal melts and collects at the bottom of the reactor chamber, from which the metal melt can be tapped, optionally together with slag. With the reduction of iron oxides, the iron is carbonized to a certain extent upon contact with the coke bed, whereby the melting point is reduced.

In accordance wit a third embodiment of said method, metal oxides are charged to the bottom of the reactor chamber in such a finely divided state that the oxide is carried up through the bed by the fluidizing gas while simultaneously being reduced, and departs from the bed in a reduced state together with the gases from the bed, from which gas the reduced material is separated in, e.g. a cyclone. The coke bed is held beneath the temperature at which reduced material will agglomerate to any appreciable extent.

In accordance with a fourth embodiment of said method, the metal oxide is supplied to the surface of the fluidized bed in a granulated form of such coarseness that it passes down through the bed whilst being reduced and during progressive consumption of the coke, whereafter the reduced material is tapped from the reactor at the underside of the bed, preferably separated from the coke material.

The gas formed in the actual bed upon pyrolysis and cracking of organic material supplied thereto can be used for fluidizing the coke bed in the aforementioned reduction processes.

The main advantage gained over conventional reduction of metal oxides in fluidized beds when applying the four aforementioned examples of the invention with respect to the reduction of metal oxides, is that sintering, which readily occurs with conventional methods, is avoided with the present invention, or is permitted to take place under controlled forms.

In certain instances, however, the method of the present invention can be used to advantage in conjunction with the reduction of metal oxides, particularly iron oxides, in an inductively heated fluidized bed comprising mainly metal powder or metal granules. The metal oxides are supplied to the bed together with solid, liquid or gaseous reduction agent and are caused to react in said bed during the formation of gaseous reaction products and metal in powder or granule form, and metal powder or granules are removed from the reactor at a rate sufficient to maintain the volume of the bed substantially constant. The aforementioned risk of sintering of the bed of metal particles can be avoided when using inductive heating in accordance with the present invention owing to the close temperature control afforded by the method.

Heat-requiring synthesis of organic or inorganic chemical compounds can be carried out to advantage in accordance with the invention in a fluidized bed, in which there is inductively maintained a temperature sufficient to effect the synthesis reaction, optionally in the presence of a material having a catalytic effect on the synthesis reaction. This material may comprise metal powder or granules and simultaneously forms the inductively heated bed. Further, the gas required to fluidize the bed may comprise wholly or partly the reactants supplied to the bed. Inorganic compounds which can be produced in this way include, e.g. carbides, nitrides and halogen compounds. An example of organic synthesis is the manufacture of hydrocarbons, e.g. ethylene, by the reaction between hydrogen gas and an inductively heated coke bed, wherewith high yields of the desired hydrocarbons can be obtained by adjusting the temperature of the bed and the residence time of the material therein.

In reactors of the type envisaged here the electrical insulation between respective turns of the coil and, when applicable, between the part coils may create certain problems, if the reactor walls have a certain degree of permeability. Among other things, it has been found that carbon monoxide containing gas in certain instances is able to penetrate from the charge through the reactor wall and cause carbon to precipitate out, which can result in sparking on the coil. These problems will be accentuated in the case of extremely large, inductively heated reactors and furnaces, wherein it may be necessary to use voltages hitherto unused in induction heating techniques. One particularly serious disadvantage encountered with coils constructed in accordance with present day techniques is that in order to repair the coil it must be completely disassembled which is an expensive process and which could not be accepted with the aforementioned methods from an operational and economic point of view.

It has been found possible, however, to avoid sparking in the induction coil to a surprisingly large extent, when the method of the invention is effected in a reactor, the reactor chamber of which is defined by wall members, which separate the induction coil from said chamber and have a certain degree of gas permeability, if there is passed to said wall members a gas which is under a pressure exceeding the highest pressure prevailing in the zone of said chamber located opposite the induction coil, and which is unable to establish electric conducting connection between the turns of the coil.

In accordance with one suitable method of procedure, the gas under pressure passed to the wall members may be prevented from departing in a direction away from said chamber. This can be accomplished in accordance with one example by enclosing at least the portion of the reactor covered by the induction coil in a pressure chamber. The gas under pressure may be suitably passed to the wall members via the pressure chamber. In accordance with another example in conjunction with the first-mentioned method of procedure, the regions between adjacent coil turns may be sealed against the atmosphere surrounding the reactor, whilst the gas under pressure is supplied to said wall members inwardly of said sealed regions.

The risk of sparking between the turns of the induction coil cannot be totally eliminated, however. It has therefore been found advantageous to combine the aforementioned method of procedure with remedial steps which enable parts of an induction coil to be repaired without necessitating the total disassembly of the reactor. This can be effected by using an induction coil constructed of a plurality of elements which extend around the reactor through at most 180°.

It may also be to advantage to use an induction coil constructed of a plurality of part-coils. Further, each coil turn can be placed in one plane. In this way there is obtained separate single-turn loops which can be joined together to form part-coils having any number of turns. The advantages afforded by this arrangement reside in the fact that:

it enables a structurally simple design of the insulating seal between the coil turns between which gas is injected inwardly of the seal as described above, it affords the greatest conceivable possibility of adjusting the number of turns of the part-coils to the electrical characteristic of the heated medium, it simplifies the division of the coil into elements and, at the same time, facilitates the exchange of said elements, and it enhances the possibility of taking up the expansion which normally occurs in the reactor during operation, whilst retaining the gas-tightness of said reactor.

A further advantage afforded with planar one-turn loops is that the loops can be joined together to form part-coils having a selected number of turns in such a manner that the voltage 0 occurs between the adjacent turns of two part-coils. This is possible if adjacent part-coils are given different winding directions and if, at the same time, adjacent ends of adjacent part-coils are connected to the same point in the current supply system.

This arrangement ensures that the gap located between two part-coils is not loaded with the high voltage corresponding to the voltage between the turns in a part-coil times the number of turns in said part-coil.

The aforementioned gas under pressure passed to said wall members will flow into the chamber accommodating the material being heated through said wall members, which are to a certain degree permeable to said gas. It is therefore important that the composition of the gas selected is not harmful to the nature of the heating process being effected.

When there is a risk that carbon will precipitate out in the wall members, for example when effecting reduction processes in said chamber whilst using carbonaceous reduction agents, it may be to advantage to use a substantially inert gas whose oxygen or hydrogen potential is such that the precipitation of carbon is prevented in at least the portions of the wall members located adjacent the induction coil.

A number of embodiments of the invention will now be described in more detail with reference to the accompanying drawings, which show very diagrammatically vertical sectional views of plants in which the invention can be carried out.

Figures 1, 2, 3:
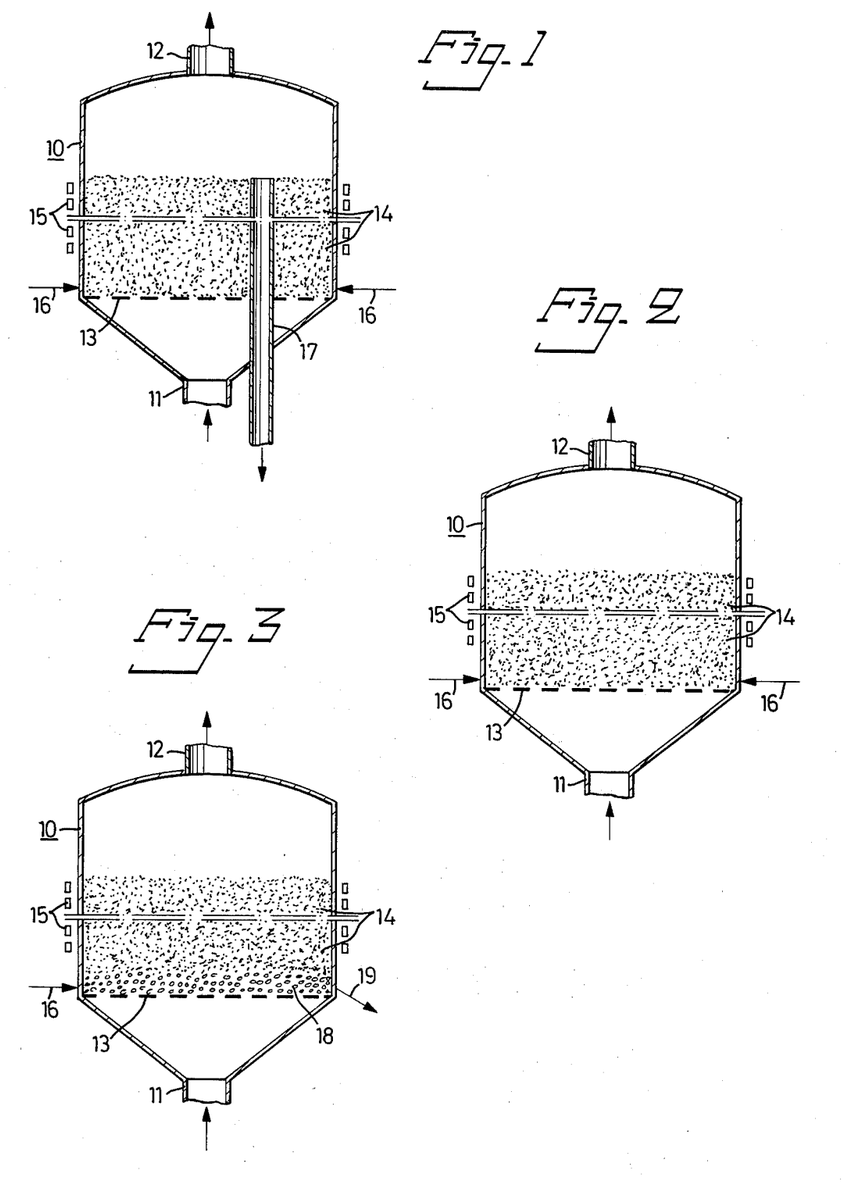
FIG. 1 shows a reactor for producing petroleum coke.
FIG. 2 shows a reactor for reducing and/or carburating a gaseous medium.
FIGS. 3–5 show reactors for reducing metal oxides.

In FIG. 1 there is shown a reactor 10 having a gas inlet 11, a gas outlet 12 and a grate 13 for supporting a bed 14 of fluidized material located in the reactor. On a level with the bed 14, the reactor is surrounded by an induction coil 15, which is connected to a source of alternating current (not shown). Hydrocarbons, such as heavy fractions of hydrocarbons obtained when cracking mineral oil, are injected continuously into the bed 14 through pipes 16.

In the bed 14, which comprises mainly coke, there is maintained a temperature of such magnitude that the hydrocarbons, which are preferably charged to the bed in a pre-heated state, are cracked and form new coke together with combustible gaseous products, which together with the fluidizing gas depart from the reactor through outlet 12. These gases can be used as fuel. Optionally, part of the gases, suitably in a hot state, can be recirculated via inlet 11 to the reactor 10 for fluidizing the bed material. The gaseous products formed during the cracking process also contribute to fluidizing the bed material and, in certain instances, contribute in this respect to such an extent that the supply of gas through inlet 11 can be interrupted.

The residence time of the solid material in the bed and the temperature of the bed can be so adjusted that the resulting solid residue of hydrocarbons charged to the reactor obtain the desired quality. For example, the residence time and temperature of the bed can be adjusted so that the resulting coke is also refined with respect to sulphur.

Coke is tapped from the bed 14 through a discharge pipe 17 at the same rate as new coke is formed in said bed, the upper open end of which pipe is located at the level at which the upper surface of the bed 14 is desired.

In FIG. 2 the reference numerals 10–13 and 16 have the same significance as in FIG. 1. Through the inlet 11 there is passed a gas which is to be reduced and carburated, e.g. a gas used for the reduction of metal oxides and containing CO, $H_2$, $CO_2$ and $H_2O$. The gas, preferably pre-heated, is passed into the reactor 10, where it is caused to fluidize the bed material. The hydrocarbons required to effect the reduction and carburation process are charged to the bed 14 through pipes 16. In this instance, the bed 14 comprises particles of metal coated with carbon and having a catalytical effect on the reduction and carburation process. The carbon coating on the metal particles, which is consumed during reduction and carburation process, is renewed by maintaining a bed temperature of such magnitude that carbon is formed by pyrolysis of the hydrocarbons supplied through pipes 16 and cracking of the pyrolysed gas, resulting in carbon precipitation.

In FIG. 3 the reference numerals 10–13, 15 and 16 have the same significance as the reference numerals in FIGS. 1 and 2. Metal oxide material, e.g. iron oxide having a fluidizable particle size, is charged through pipe 16 to the lower portion of the bed 14, which comprises mainly coke, together with a reductant, preferably hydrocarbons, required for reducing the metal oxide material. If the reductant is in gas form, it may be charged to the bed through inlet 11 instead of pipe 16. The temperature in the reactor 10 is adjusted so that the hydrocarbons charged to the reactor are pyrolized and cracked to form coke and so that the reduced metal, optionally together with resulting coke ash, is agglomerated into larger granules, which as a result of their higher specific gravity in relation to the bed material sink through the bed to form a layer 18 of relatively coarse material, which is tapped from the reactor through a pipe 19. The material is tapped through said pipe 19 at a rate such that the volume of the bed in the reactor chamber is maintained substantially unchanged.

Figure 4:
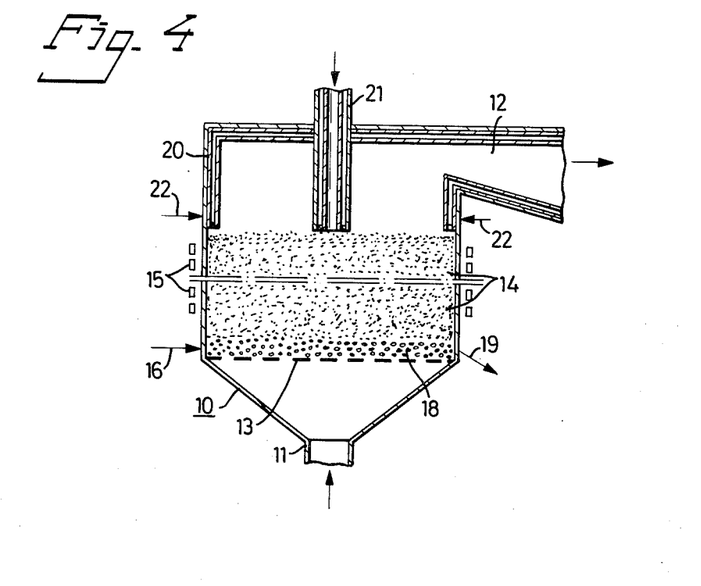

In FIG. 4, where the reference numerals 10–16, 18 and 19 have the same significance as in FIG. 3, the upper portion of the reactor 10 is in the form of a radiation portion of a steam boiler (not shown). Thus, the upper portion of the reactor forms an externally heat-insulated jacket 20 through which water or water steam is arranged to pass. Metal oxide to be reduced, together with coke or coal in a fluidizable particle size, are charged to the upper surface of the bed through concentrically extending supply pipes 21. Optionally, hydrocarbons, for example, can be injected into the bed 14 through pipe 16. Similarly, the fluidizing agent supplied through inlet 11 may comprise a reducing gas. The temperature in the reactor is selected in the manner described with reference to FIG. 3, so that there is formed a lower layer 18 of relatively coarse material comprising reduced metal and possibly also agglomerated coke ash. The coarse material is tapped through the pipe 19 at a rate such as to maintain a substantially constant bed volume in the reactor chamber. The combustible gases formed during the reduction processes are burned by supplying air and optionally additional fuel through pipes 22 to the reactor chamber above the bed 14, wherewith the heat obtained by the combustion process contributes to the energy supply of the process.

Figure 5:
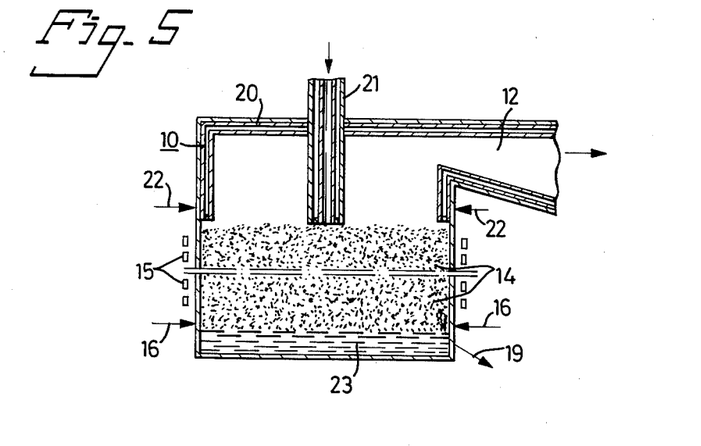

In FIG. 5, where the reference numerals 10, 12, 14–16 and 19–22 have essentially the same significance as in FIG. 4, there is shown a plant in which a reduction process relatively similar to that described with reference to FIG. 4 is carried out. In this instance, however, the temperature in the reactor 10 is adjusted so that the reduced metal is obtained in molten form in a zone 23 located at the bottom of the reactor, from which zone the melt is tapped off at 19. In addition to metal oxide and solid reductant, slag builders or refining agents may also be supplied through the supply pipes 21. The bed material is maintained in a fluidized state mainly by the gas formed during the reduction process. Additional fluidizing medium, e.g. liquid hydrocarbons or a reducing or inert gas, can be supplied through the pipes 16 above the zone 23.

Figure 6:
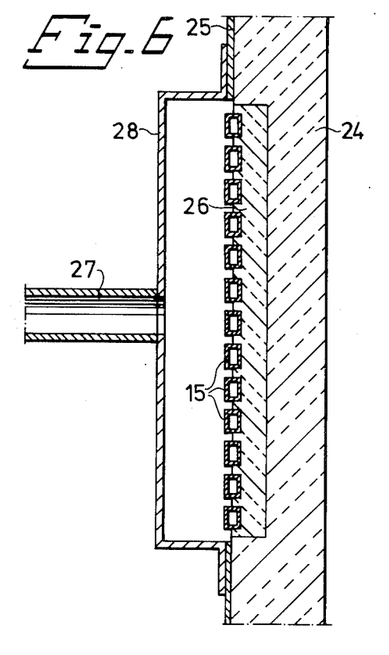
FIGS. 6–9 show in vertical section a portion of a reactor wall provided with four different devices for avoiding sparking in the induction coil.

FIG. 6 shows a portion of a reactor wall, comprising a ceramic lining 24 and a shell 25. The reference numeral 15 identifies an induction coil which is arranged externally of the lining 24 and which is constructed from tubes which can be cooled by passing a cooling liquid therethrough. The coil 15 is partially embedded in a ceramic filling mass 26. Both the lining 24 and the filling mass 26 have a certain degree of gas permeability.

To prevent the passage of solid, liquid or gaseous material to the coil 15 from the side of the reactor wall opposite the coil, i.e. from the reactor chamber in which the material to be heated is accommodated, a pressure is maintained in the wall members 24, 26 on a level with the coil 15 by means of a gas, said pressure exceeding the highest pressure which prevails in the zone of the reactor chamber located opposite the induction coil. The gas selected is one which is unable to establish electrical conducting connection between the coil turns of the coil 15. The pressure is maintained by passing gas under pressure, for example air or a substantially inert gas, through a supply pipe 27 to a pressure chamber 28 surrounding the induction coil 15 and sealing the latter against the ambient atmosphere.

Figure 7:
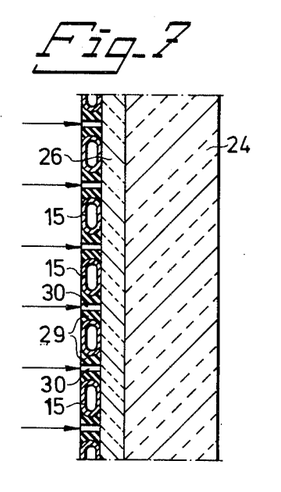

FIG. 7 also shows a portion of a reactor wall having a lining 24, filling mass 26 and induction coil 15. The regions between adjacent coil turns are sealed against the atmosphere surrounding the reactor by means of a sealing device 29 made of a suitable insulating material. Disposed in the device 29 is a number of apertures 30 through which gas under pressure is passed to the portions of the reactor wall 24, 26 located on a level with the coil 15, as shown by the arrows.

Figure 8:
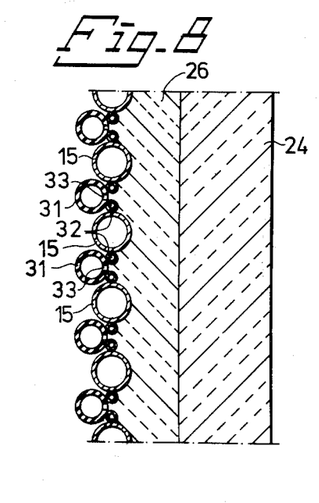

FIG. 8 shows an embodiment which, in principle, coincides with the embodiment of FIG. 7. A portion of a reactor wall comprising a lining 24 and a filling mass 26 is surrounded by a spirally wound induction coil 15. The seal between adjacent coil turns is provided by means of a similarly spirally wound hose or the like 31 made of an elastomeric material. For the purpose of obtaining small, and therewith more effective sealing abutment surfaces between the hose 31 and the coil 15, pipes 32 of small diameter are welded to said coil 15. The hose 31 also serves to supply gas under pressure to the wall members 24, 26 and, to this end, is coupled to a source of pressure medium (not shown) and is provided with gas outlet openings 33 directed towards the reactor wall.

Figure 9:
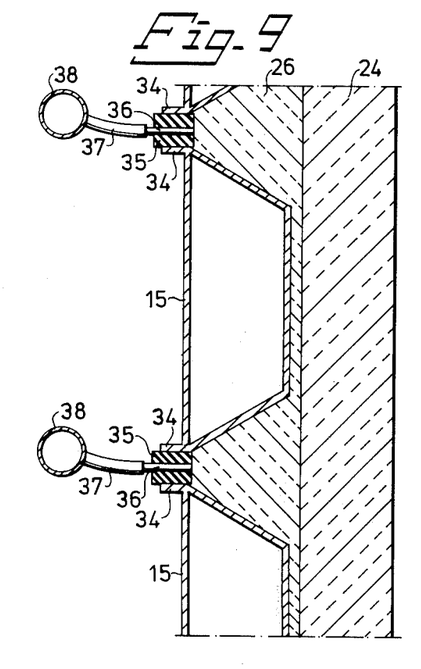

FIG. 9 also shows a portion of a reactor wall comprising lining 24 and filling mass 26 and surrounded by an induction coil 15. Each coil turn has a parallel-trapezium cross-sectional shape and is provided at the top and bottom thereof with outwardly projecting flanges 34. Arranged between adjacent flanges 34 of adjacent coil turns are seals 35 which are made of an elastomeric material and which are provided with apertures 36 through which gas under pressure can be passed to the filling mass 26. A plurality of apertures disposed along the length of the coil turns are arranged in the seal 35 between sequential coil turns. Gas is passed to the apertures 36 through distributing pipes 37, which extend from a supply pipe 38 arranged to serve a number of distributing pipes 37.

Figures 10, 11, 12:
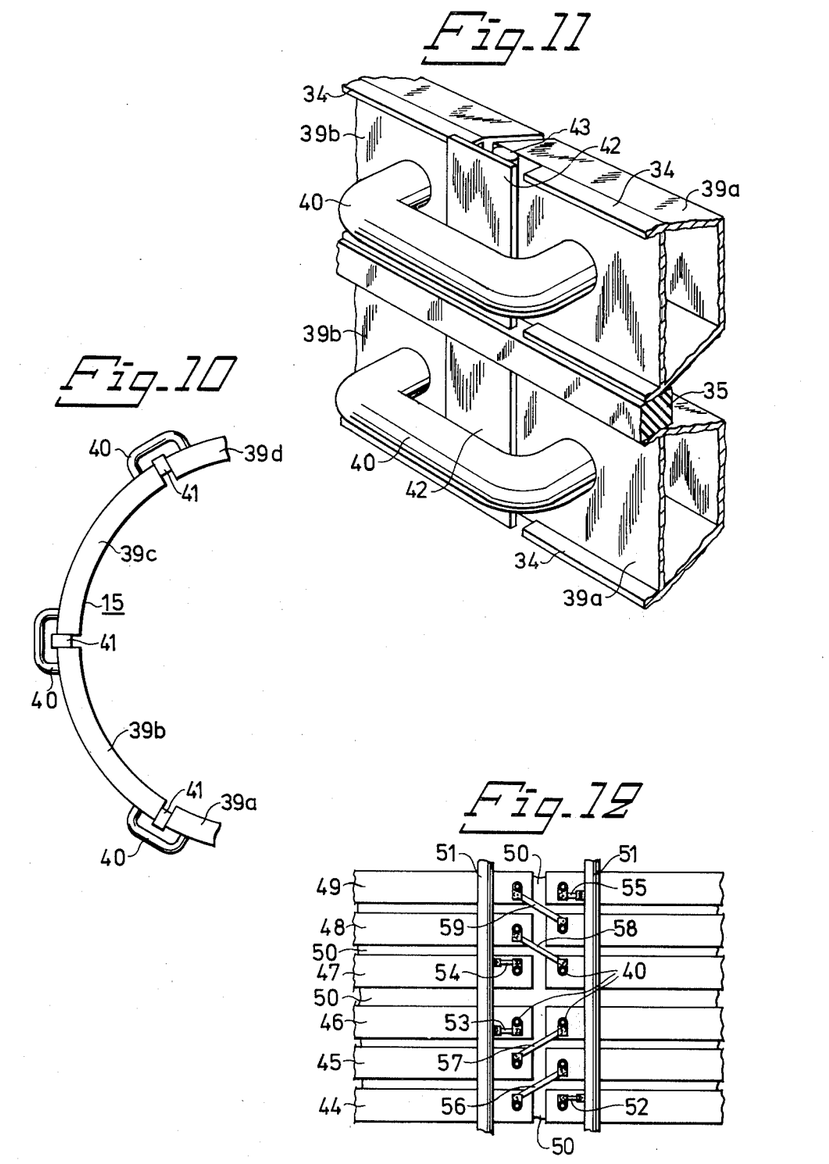
FIG. 10 is a fragmentary plan view of an induction coil constructed of a plurality of elements having a small angle of arc.
FIG. 11 is a fragmentary view in perspective of an induction coil constructed substantially in accordance with FIGS. 9 and 10.
FIG. 12 is a fragmentary side view of two part-coils constructed of planar coil turns and energised in a preferred manner.

FIG. 10 illustrates how each coil turn in a coil 15 can be constructed of several elements 39a–39d which are suitably placed in one and the same plane and each of which embraces an angle below 180°. The reference numeral 40 identifies lines for conducting cooling liquid and optionally also current between adjacent elements 39a–39d, while the reference numeral 41 identifies seal means arranged to seal between adjacent ends of said elements 39.

FIG. 11 shows in more detail the connecting point between two adjacent elements 39a, 39b according to FIG. 10, said elements having substantially the construction shown in FIG. 9. The flanges 34 of one element 39a terminate short from the end of said element, while the other element 39b has a flange 42 which projects beyond the element 39a. Sealing between adjacent element ends is effected by means of a seal 43 clamped between the inside of flange 42 and the outside of element 39a, said seal 43 permitting a certain degree of movement between the elements 39a, 39b in their longitudinal direction.

FIG. 12 shows an induction coil which is constructed of two part-coils, each of which comprises three coil turns 44–46 and 47–49, respectively. Each coil turn is arranged in one and the same plane and can be divided into elements in the manner shown in FIG. 10. Seals 50 are arranged between the meeting ends of each coil turn and between adjacent coil turns. The reference numeral 51 identifies lines for supplying current to the part-coils 44–46 and 47–49. The current is taken from the supply lines through contact means 52–55, whilst current is passed between adjacent coil turns in each part-coil through contact means 56–59. As will be seen from the Figure, the part-coils 44–46 and 47–49 have different winding directions and adjacent ends of the part-coils are connected to, in principle, the same point in the current supply system, whereby the voltage between the coil turns 46 and 47 is constantly zero.

The advantages afforded by the method of the present invention will now be illustrated with reference to a number of examples.

EXAMPLE 1

A fluidized bed having a diameter of 7.0 m and a height of about 5.0 m was maintained at a temperature of about 1200°C in a reactor of the type shown in FIG. 1. About 20,000 Nm³/h of a slightly reducing gas was supplied at about bed temperature through the bottom of the reactor to fluidize the bed material which consisted of coke particles having an average particle size of 0.15 mm. Mineral oil having a carbon content of about 85% by weight, a hydrogen content of about 10% by weight and a sulphur content of about 3% by weight was injected into the bed in an amount of about 115 tons per 24 h. Coke in an amount of about 40 tons per 24 h and having a sulphur content less than 0.1% by weight was fed out from the top of the bed and during the same period of time about 128,000 Nm³ of a gas consisting of gaseous cracking products comprising about 25% by volume of hydrogen and the remainder lower hydrocarbons was obtained which together with the fluidizing gas was blown out of the reactor. Part of this gas was partially combusted and re-circulated to form the slightly reducing gas utilized for the fluidization. Energy in an amount of 120 MWh per 24 h was supplied to the bed electroinductively at a frequency of 2600 Hz by means of an induction coil surrounding the reactor on a level with the fluidized bed and having a diameter of 7.5 m and a height of 4.5 m. Said energy was sufficient for maintaining the bed temperature and for forming the petroleum coke.

EXAMPLE 2

A fluidized bed having a diameter of 2.0 m and a height of about 1.8 m was maintained at a temperature of about 1100°C in a reactor of the type shown in FIG. 2. About 4500 Nm³/h of a gas obtained from a sponge iron furnace, which had a composition of about 40% by volume of $CO_2$, 10% of volume of $H_2O$ and the remainder substantially $H_2$ and CO, was supplied at a temperature of about 900°C through the bottom of the reactor to fluidize the bed material which consisted of coke particles having an average particle size of 0.4 mm. About 190,000 Nm³ per 24 h of a gas having a composition of 52% by volume of $H_2$, 45% by volume of CO and the remainder substantially $CO_2$ and $H_2O$ was blown out of the reactor. Oil of the type Bunker C was injected into the bed in an amount of 36 tons per 24 h to replace the coke consumed owing to the reduction of the fluidizing gas. Energy in an amount of 137 MWh per 24 h was supplied to the bed electroinductively at a frequency of 36.5 kHz by means of an induction coil surrounding the reactor on a level with the fluidized bed and having a diameter of 2.5 m and a height of 1.5 m. Said energy was sufficient for maintaining the bed temperature, reducing the fluidizing gas and forming petroleum coke from the oil.

EXAMPLE 3

A fluidized bed having a diameter of 7.0 m and a height of about 5.0 m was maintained at a temperature of about 1050°C in a reactor of the type shown in FIG. 3. About 20,000 Nm³/h of an inert gas was supplied at a temperature of 900°C through the bottom of the reactor to fluidize the bed material which consisted of coke particles having an average particle size of 0.15 mm. Iron oxide, containing 65% by weight of Fe and having an average particle size substantially equal to that of the coke, was continuously charged into the lower portion of the bed in an amount of about 150 tons per 24 h together with coal dust in an amount of 35 tons per 24 h and containing about 30% by weight of volatiles and 12% by weight of ashes. Sponge iron in an amount of about 100 tons per 24 h and having a total iron content of 97% by weight and a carbon content of about 1% by weight was fed out from the bottom of the bed together with 4 tons per 24 h of agglomerated ashes. 23,000 Nm³/h of gas containing about 4% by volume CO was blown out of the reactor. Energy in an amount of 110 MWh per 24 h was supplied to the bed electroinductively at a frequency of 2600 Hz by means of an induction coil surrounding the reactor on a level with the fluidized bed and having a diameter of 7.5 m and a height of 4.5 m. Said energy was sufficient for maintaining the bed temperature and for meeting the energy demand for the coking and reduction reactions. The amount of coal dust supplied to the bed was sufficient to replace the coke consumed owing to the reduction.

EXAMPLE 4

In a reduction process as described in Example 3 there was used a reactor of the type shown in FIG. 4. The gas leaving the bed was combusted in the reaction chamber above the bed by supplying air to said gas. The electric energy demand was then lowered to 99 MWh per 24 h.

EXAMPLE 5

In a reduction process as described in Example 3 there was used a reactor of the type shown in FIG. 5 and a bed temperature of about 1400°C. Molten pig iron in an amount of 98 tons per 24h and having a carbon content of about 2% by weight was tapped from the bottom of the reactor together with molten slag in an amount of about 5 tons per 24 h. The gas leaving the bed was combusted as described in Example 4. The electric energy demand amounted to 120 MWh per 24 h.

EXAMPLE 6

In the production of ethylene by cracking of hydrocarbons a fluidized bed having a diameter of 2.0 m and a height of about 1.8 m was maintained at a temperature of about 1200°C in a reactor of the type shown in FIG. 2. About 4000 Nm³/h of hydrocarbons consisting essentially of ethane was supplied at a temperature of about 900°C through the bottom of the reactor to fluidize the bed material which consisted of silver coated nickel granules having an average diameter of 0.10 mm. About 180,000 Nm³ per 24 h of a gas consisting of gaseous cracking products containing about 47% by volume of ethylene and 47% by volume of hydrogen was blown out of the reactor. Energy in an amount of 110 MWh per 24 h was supplied to the bed electroinductively at a frequency of 5000 Hz by means of an induction coil surrounding the reactor on a level with the fluidized bed and having a diameter of 2.5 m and a height of 1.5 m. Said energy was sufficient for maintaining the bed temperature and to meet the energy demand for the cracking reactions.

The invention is not restricted to the illustrated and described examples but can be modified within the scope of the following claims.

We claim:

1. A method of carrying out heat-requiring processes in a reactor containing a fluidized bed, comprising electroinductively generating at least part of the energy required to carry out the process in the bed itself by passing alternating current through at least one induction coil located externally of the reactor chamber, said fluidized bed containing material which provides the bed with a resistivity of between $10^{-1}$ and 10 ohm $m$, the frequency of the alternating current being so selected in dependence of the selected smallest cross dimension ($d$) of the bed area and of the resistivity ($\rho$) of the bed, that the relationship between said smallest cross dimension ($d$) and the electromagnetic field penetration depth ($\delta$), is maintained at a value of between 0.2 and 1.5, which also satisfies the relationship $$d/\delta = k\ (0.54 - 0.35 \cdot {}^{10}\log\rho)$$

where $k$ is a numerical value between 1.1 and 1.5.

2. The method according to claim 1, wherein part of the heat required for the process is charged to the reactor chamber by burning combustible substances therein.

3. The method according to claim 1, wherein the method is applied in conjunction with cracking hydrocarbons while simultaneously producing petroleum coke, said hydrocarbons being supplied to a fluidized coke bed, said fluidized coke bed being maintained inductively at a temperature sufficient to crack the hydrocarbons and to produce coke therefrom and from the resulting cracking products, said bed being continuously replenished by the coke thus formed, and including removing coke from the reactor chamber in quantities to maintain the volume of the bed substantially unchanged.

4. The method according to claim 3, including fluidizing the bed material with the gas formed upon cracking of the hydrocarbons in the bed.

5. The method according to claim 3, including adjusting the residence time of the formed coke in the bed and the temperature of the bed so that said coke is refined with respect to sulphur.

6. The method according to claim 1, wherein said method is applied in conjunction with the refining of coked material which is supplied to a fluidized bed comprising mainly refined coke material, including inductively generating heat in the fluidized bed and regulating the bed temperature and residence time for the material in the bed so that refining effect is obtained, and removing refined coke material substantially continuously from the reactor to maintain the volume of the bed substantially unchanged.

7. The method according to claim 1, wherein said method is applied in conjunction with cracking heavy hydrocarbons which are supplied to a permanent fluidized bed comprising particles of metal having a catalytic effect on the reaction, including inductively generating heat in the fluidized bed to maintain the correct cracking temperature and maintaining said bed in a fluidized state by means of at least the gases formed in the bed itself during the cause of the cracking process.

8. The method according to claim 7, wherein the bed is also maintained in a fluidized state by means of hydrogen gas supplied thereto, said gas being caused to react with the hydrocarbons supplied to the bed to form new hydrocarbons richer in hydrogen, and including departing said latter hydrocarbons from the bed in gas form and recovering them externally of the reactor.

9. The method according to claim 3, wherein water steam is also used as cracking and bed fluidizing medium.

10. The method according to claim 1, wherein said method is applied in conjunction with the pyrolysis of a solid organic material, including charging said material to a fluidized bed comprising mainly coke material formed during the pyrolysis, maintaining inductively in the bed at least a pyrolysis temperature of such magnitude that the solid residue formed during the pyrolysis and the hydrocarbons released therewith react with each other to cause carbon to precipitate onto said solid residue, thereby to form a coke material which replenishes the bed, departing gases, and removing a quantity of coke material substantially corresponding to the amount of coke material newly formed from the reactor to maintain the volume of the bed substantially unchanged.

11. The method according to claim 10, wherein the gases formed by pyrolysis of the organic material in the bed itself are used to fluidize the bed material.

12. The method according to claim 1, wherein the method is applied in conjunction with the calcination of solid organic materials.

13. The method according to claim 1, wherein the method is applied in conjunction with the reduction of a gaseous medium which is caused to pass through and simultaneously to fluidize an inductively heated bed, including contacting the medium with a reductant, and maintaining the bed at such a temperature that the reductant reacts with said medium during reduction thereof.

14. The method according to claim 13, wherein there is used a bed of coke material which simultaneously forms said reductant and which is successively consumed during the reduction process.

15. The method according to claim 14, including maintaining the bed at least at a temperature such that the ash formed during the progressive consumption of the coke bed is caused to agglomerate to relatively coarse particular material, collecting said material as a result of its heavier weight than the coke in the bottom of the reactor, and removing it from the reactor.

16. The method according to claim 13, wherein there is used a bed of substantially metallic material.

17. The method according to claim 13, wherein there is used a bed comprising substantially particles coated with carbon, and includes progressively consuming during the process the carbon coating which forms said reductant and renewing the carbon coating by supplying liquid or gaseous hydrocarbons to the reaction chamber and by maintaining such a bed temperature that carbon is formed by pyrolysis of the hydrocarbons and by cracking of the pyrolysis gas, resulting in carbon precipitation.

18. The method according to claim 1, wherein the method is applied in conjunction with the reduction of metal oxides having a fluidizable particle size distribution, including supplying metal oxides to a fluidized bed comprising mainly coke, and heating said bed inductively during progressive consumption thereof.

19. The method according to claim 18, including maintaining the coke bed at a temperature such that reduced metal is caused to agglomerate to granules, collecting said granules as a result of their heavier weight than the coke forming the bed in the bottom of the reactor chamber and removing them from the reactor.

20. The method according to claim 18, including maintaining the coke bed at a temperature such that reduced metal is caused to melt, collecting the molten metal upon its passage through the bed in the bottom of the reactor chamber and removing it from the reactor chamber together with slag formed simultaneously therewith.

21. The method according to claim 1, wherein the method is applied in conjunction with the reduction of metal oxides including supplying metal oxides to an inductively heated fluidized bed comprising mainly coke, in such finely divided form that said oxides are carried up through the bed by the fluidizing gas, and wherein the oxides are at least partially reduced during progressive consumption of the coke and depart from the bed and from the reactor chamber together with the fluidizing gas, and maintaining the coke bed at a temperature beneath the temperature at which the reduced material will agglomerate to any appreciable extent.

22. The method according to claim 1, wherein the method is applied in conjunction with reduction of metal oxides including supplying metal oxides to an inductively heated fluidized bed comprising mainly coke in such coarse particulate form that they pass downward through the bed while being reduced and during progressive consumption of the coke in the bed, and tapping the reduced material from the reactor at the under side of the bed.

23. The method according to claim 14, wherein consumed coke is replaced by supplying organic material to the bed, and the bed is maintained at least at a temperature such that coke is formed from the organic material.

24. The method according to claim 23, wherein the gas formed in the bed itself upon pyrolysis and cracking of supplied organic material is used for fluidizing the coke bed.

25. The method according to claim 1, wherein the method is applied in conjunction with the reduction of metal oxides having a fluidizable particle size distribution including supplying the metal oxides to a fluidized bed comprising mainly metal particles, inductively heating said bed supplying reducing agent to the bed to reduce said metal oxides therein during the formation of gaseous reaction products and metal in particle form, and removing metal particles from the reactor at a rate sufficient to maintain the volume of the bed substantially constant.

26. The method according to claim 1, wherein the method is applied in conjunction with heat-requiring, synthetic production of organic or inorganic compounds, including supplying the starting materials to a fluidized bed and maintaining a temperature suitable for the synthesis reaction inductively in the bed.

27. The method according to claim 26, wherein there is used a bed of metal particles having a catalytic effect on the synthesis reaction.

28. The method according to claim 26, wherein the gas required to fluidize the bed is comprised at least partially to the reactants supplied to the bed.

29. The method according to claim 1, wherein combustion of burnable substances is effected in the reactor chamber above the fluidized bed, and wherein part of the heat required to carry out the process is applied to the bed mainly by radiation from the combustion gases.

30. The method according to claim 29, wherein the heat formed upon combustion of the burnable substances and not taken up by the material in the reactor chamber is recovered in said chamber in a radiation portion of a steam boiler arranged adjacent the reactor, said radiation portion being located in said reaction chamber.

31. The method according to claim 1, wherein the heat content of the gases formed in the reactor chamber is at least partially used for producing energy.

32. The method according to claim 31, wherein the produced electric energy is used to supply energy to the process.

33. The method according to claim 1, effected in a reactor, the reactor chamber of which is defined by wall members which separate the induction coil from said chamber and have a certain degree of gas permeability, including passing to said wall members a gas which is under a pressure exceeding the highest pressure prevailing in the zone of said chamber located opposite the induction coil and which is unable to establish electric conducting connection between the coil turns.

34. The method according to claim 33, wherein the gas under pressure passed to the wall members is prevented from flowing out through said wall members in a direction away from said chamber.

35. The method according to claim 34, wherein at least a portion of the reactor covered by the induction coil is enclosed in a pressure chamber.

36. The method according to claim 35, including passing the gas to said wall members via said pressure chamber.

37. The method according to claim 34, wherein the regions between adjacent coil turns are sealed against the atmosphere surrounding said reactor, and includes supplying the gas inwardly of said sealed regions.

38. The method according to claim 33, wherein there is used an induction coil constructed of a plurality of elements each of which encircles said reactor through at most 180°.

39. The method according to claim 33, wherein there is used an induction coil constructed of a plurality of part-coils.

40. The method according to claim 33, wherein each coil turn is arranged in one plane.

41. The method according to claim 39, wherein adjacent part-coils are given different winding directions, and wherein adjacent ends of adjacent part-coils are connected to the same point in the current supply system.

42. The method according to claim 1, wherein the numerical value of $k$ is about 1.2.

43. The method according to claim 6, wherein inert or hydrogen containing gas is used to fluidize the bed material.

44. The method according to claim 43, wherein the gas is pre-heated.

45. The method according to claim 7, wherein water steam is also used as a cracking and bed fluidizing medium.

46. The method according to claim 13, wherein said gaseous medium is also carburated during the reduction process.

47. The method according to claim 13, wherein the reduction is carried out in the presence of a material having a catalytic effect on the reduction reaction.

48. The method according to claim 16, wherein there is used a metallic material having a catalytic effect on the reduction reaction.

49. The method according to claim 18, wherein said metal oxides comprise oxides of metals from the iron group or oxidic copper containing material.

50. The method according to claim 19, wherein the coke bed is maintained at a temperature such that also the coke ash formed during the reduction process is caused to agglomerate to granules.

51. The method according to claim 20, wherein the bed material is also used to carbonize the molten metal passing therethrough.

52. The method according to claim 21, wherein said metal oxides are iron oxides.

53. The method according to claim 22, wherein said metal oxides are iron oxides.

54. The method according to claim 18, wherein consumed coke is replaced by supplying organic material to the bed, and wherein the bed is maintained at least at a temperature such that coke is formed from the organic material.

55. The method according to claim 21, wherein consumed coke is replaced by supplying organic material to the bed, and wherein the bed is maintained at least at a temperature such that coke is formed from the organic material.

56. The method according to claim 22, wherein consumed coke is replaced by supplying organic material to the bed, and wherein the bed is maintained at least at a temperature such that coke is formed from the organic material.

57. The method according to claim 25, wherein said metal oxides are iron oxides.

58. The method according to claim 31, wherein electrical energy is produced by means of an apparatus selected from the group comprising steam turbines, gas turbines and hot air turbines.

* * * * *